(12) United States Patent
Ishido

(10) Patent No.: US 8,270,042 B2
(45) Date of Patent: Sep. 18, 2012

(54) DOCUMENT READING APPARATUS

(75) Inventor: Katsuhiro Ishido, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 651 days.

(21) Appl. No.: 12/551,054

(22) Filed: Aug. 31, 2009

(65) Prior Publication Data

US 2010/0067065 A1 Mar. 18, 2010

(30) Foreign Application Priority Data

Sep. 12, 2008 (JP) .................................. 2008-235009

(51) Int. Cl.
H04N 1/40 (2006.01)
H04N 1/04 (2006.01)

(52) U.S. Cl. .......................... 358/449; 358/475; 358/494

(58) Field of Classification Search .................. None
See application file for complete search history.

(56) References Cited

U.S. PATENT DOCUMENTS

| 4,908,718 | A | * | 3/1990 | Shimada | 358/494 |
| 5,313,313 | A | | 5/1994 | Sato | |
| 5,805,294 | A | | 9/1998 | Furuoya | |
| 6,952,290 | B2 | * | 10/2005 | Ishido et al. | 358/475 |
| 7,471,424 | B2 | * | 12/2008 | Ishido et al. | 358/449 |
| 7,969,622 | B2 | * | 6/2011 | Saika | 358/475 |
| 8,035,865 | B2 | * | 10/2011 | Ishido et al. | 358/449 |
| 2001/0035987 | A1 | * | 11/2001 | Ishido et al. | 358/475 |
| 2007/0201105 | A1 | | 8/2007 | Shoda et al. | |

FOREIGN PATENT DOCUMENTS

| JP | 5-207239 A | 8/1993 |
| JP | 2000-138798 A | 5/2000 |
| JP | 2001-346009 A | 12/2001 |

* cited by examiner

*Primary Examiner* — Twyler Haskins
*Assistant Examiner* — Barbara Reinier
(74) *Attorney, Agent, or Firm* — Canon USA Inc. IP Division

(57) ABSTRACT

A document reading apparatus includes a document positioning plate configured to set a document to be read thereon, a light source configured to emit light onto an area where the document is set on the document positioning plate, an image sensor configured to photoelectrically convert reflected light of the light emitted from the light source to output color signals, and a document size detection unit configured to select a color signal used for document size detection from among the color signals output from the image sensor based on the color signals output from the image sensor in a state where the light source is turned off, and to detect a size of the document set on the document positioning plate based on the selected color signal output from the image sensor in a state where the light source is turned on.

10 Claims, 17 Drawing Sheets

FIG.10

| DETERMINATION RESULT OF MAIN SCANNING SIZE | DETERMINATION RESULT BY DOCUMENT SIZE DETECTION SENSOR 113 | |
|---|---|---|
| | DOCUMENT DETECTED | DOCUMENT NOT DETECTED |
| B5R, B6 | B5R | B6 |
| A4R, A5 | A4R | A5 |
| B5, B4 | B4 | B5 |
| A4, A3 | A3 | A4 |

DOCUMENT READING APPARATUS

BACKGROUND OF THE INVENTION

1. Field of the Invention

The present invention relates to a document reading apparatus configured to detect the size of a document set on a document positioning plate (platen).

2. Description of the Related Art

Conventionally, various document reading apparatuses are developed as apparatuses that are useful in detecting the size of a document that is set on a document positioning glass plate.

Japanese Patent Application Laid-Open No. 5-207239 discusses an apparatus that detects the size of a document using a charge-coupled device (CCD) and a document presence/absence sensor. This apparatus illuminates a document with a light beam emitted from a light source. Then, according to an output of the CCD, which receives light reflected from the document, the apparatus detects the length of the document in the main scanning direction. The main scanning direction corresponds to a direction in which sensor elements of the CCD are arrayed. Further, the apparatus can discriminate between documents having the same length in the main scanning direction but having different sizes based on an output of the document presence/absence sensor. In other words, the apparatus detects a document size based on the detected length of the document in the main scanning direction and the output of the document presence/absence sensor.

Since the length in the main scanning direction is detected by the CCD used for document reading and the length in the sub-scanning direction, which is perpendicular to the main scanning direction, is detected by one or a small number of document presence/absence sensors, efficient document size detection can be achieved at low cost.

However, if ambient light, such as interior light or sunlight, is incident on the document positioning glass plate from an area where the document is absent and the light quantity of the ambient light equals or is larger than the light reflected by the document, a detection error of the document size may occur.

To prevent such a detection error from occurring, Japanese Patent Application Laid-Open No. 2001-346009 discusses an apparatus that detects an area where the CCD outputs are present based on the CCD outputs that are obtained at the time the light source is turned off, and then detects the length of a document in the main scanning direction based on a signal output from the CCD in an area excluding the detected area at the time the light source is turned on.

However, if strong ambient light is incident on the document positioning glass plate on which a document that tends to transmit light, such as thin paper, is set, then even if the apparatus discussed in Japanese Patent Application Laid-Open No. 2001-346009 is used, the ambient light may pass through the document, and the area where the document is actually present may be regarded as not present, and as a result, a detection error may occur.

SUMMARY OF THE INVENTION

The present invention is directed to a document reading apparatus that is capable of accurately detecting a document size regardless of the effect of ambient light.

According to an aspect of the present invention, a document reading apparatus includes a document positioning plate configured to set a document to be read thereon, a light source configured to emit light onto an area where the document is set on the document positioning plate, an image sensor configured to photoelectrically convert reflected light of the light emitted from the light source to output color signals, and a document size detection unit configured to select a color signal used for document size detection from among the color signals output from the image sensor based on color signals output from the image sensor in a state where the light source is turned off, and to detect a size of the document set on the document positioning plate based on the selected color signal output from the image sensor in a state where the light source is turned on.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10 is a table used for determining the document size.

DETAILED DESCRIPTION OF THE EMBODIMENTS

Various exemplary embodiments, features, and aspects of the invention will be described in detail below with reference to the drawings.

Figure 1:
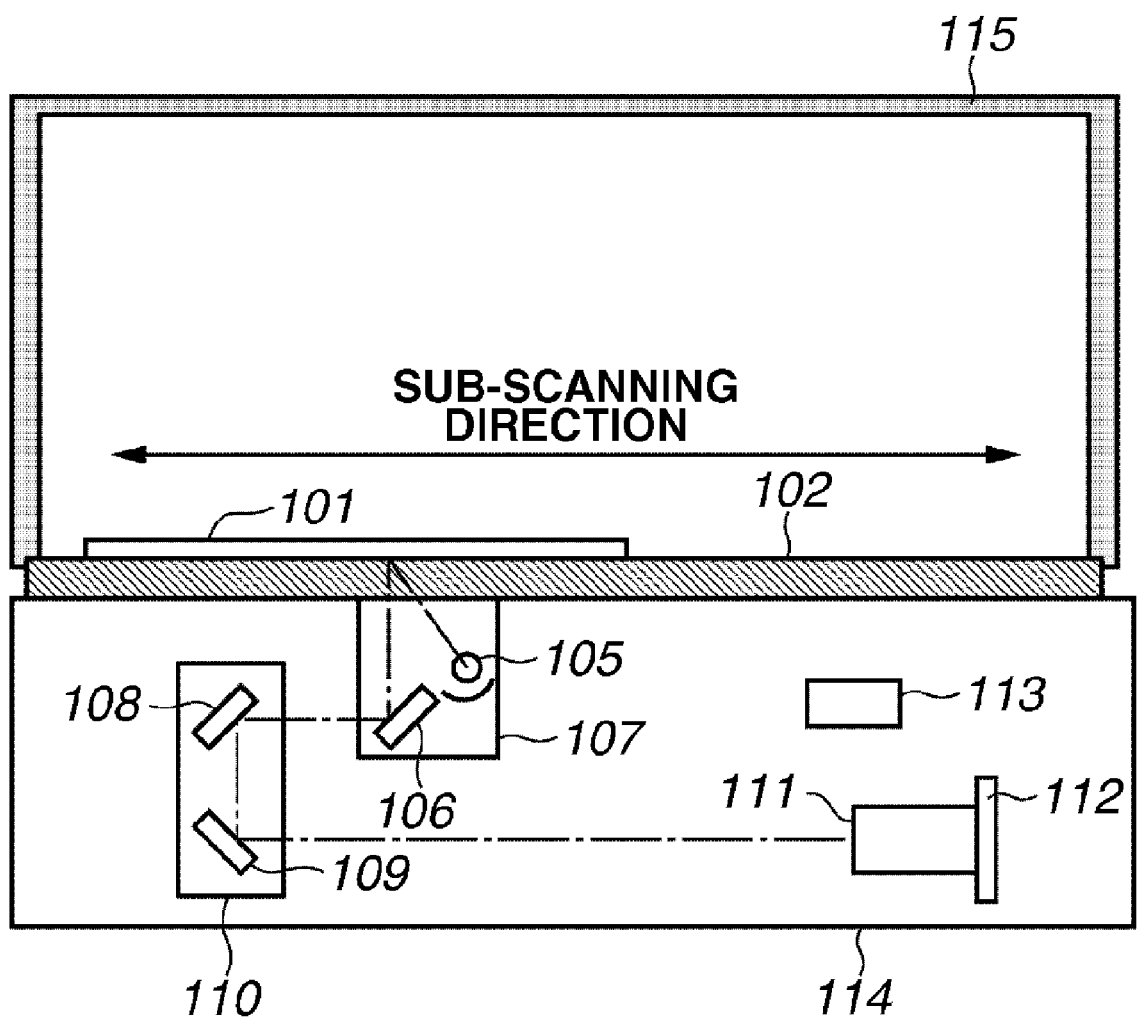
FIG. 1 is a front sectional view of a document reading apparatus according to an exemplary embodiment of the present invention.
Figure 2:
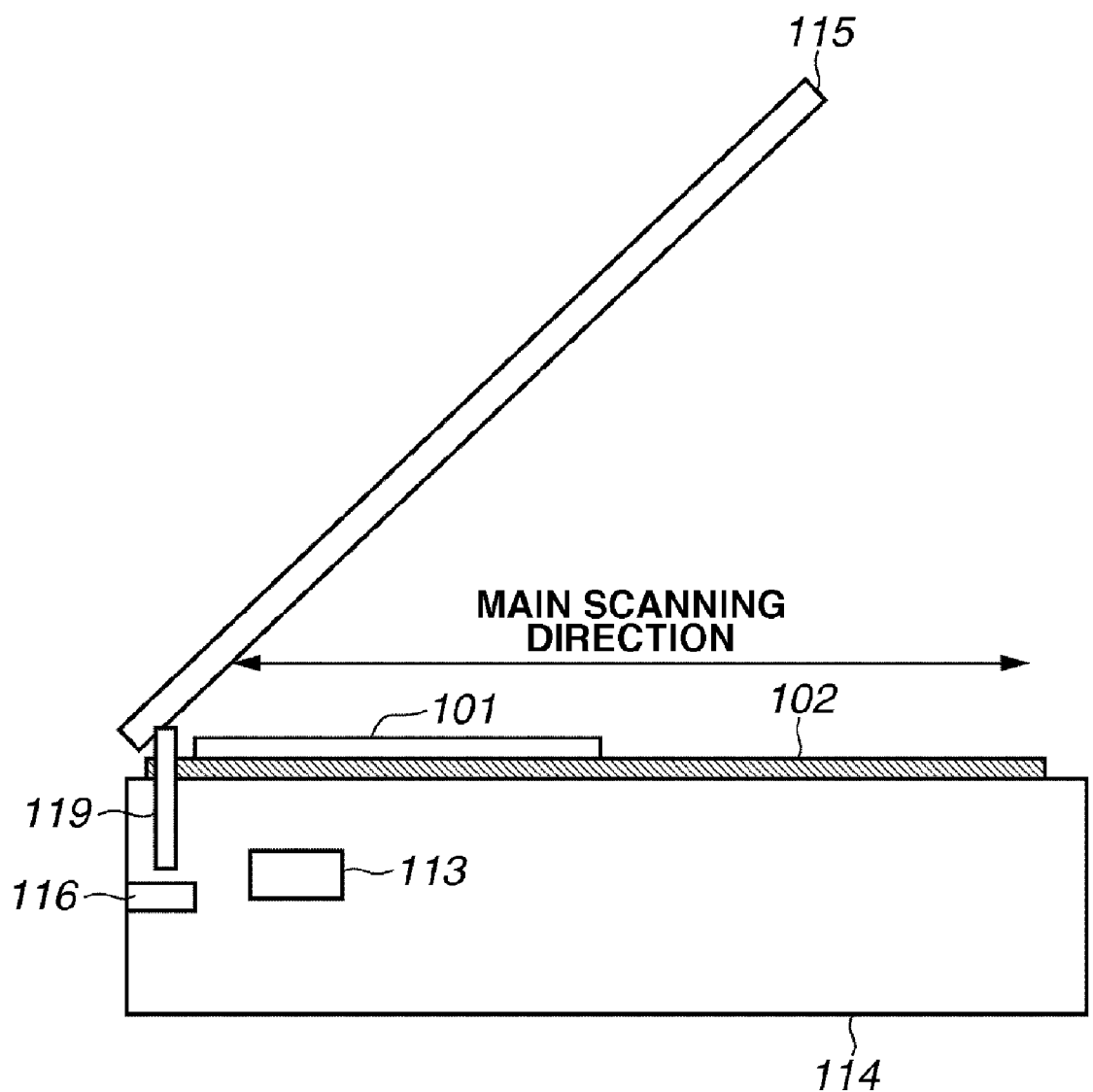
FIG. 2 is a sectional side elevation view of the document reading apparatus.
Figure 3:
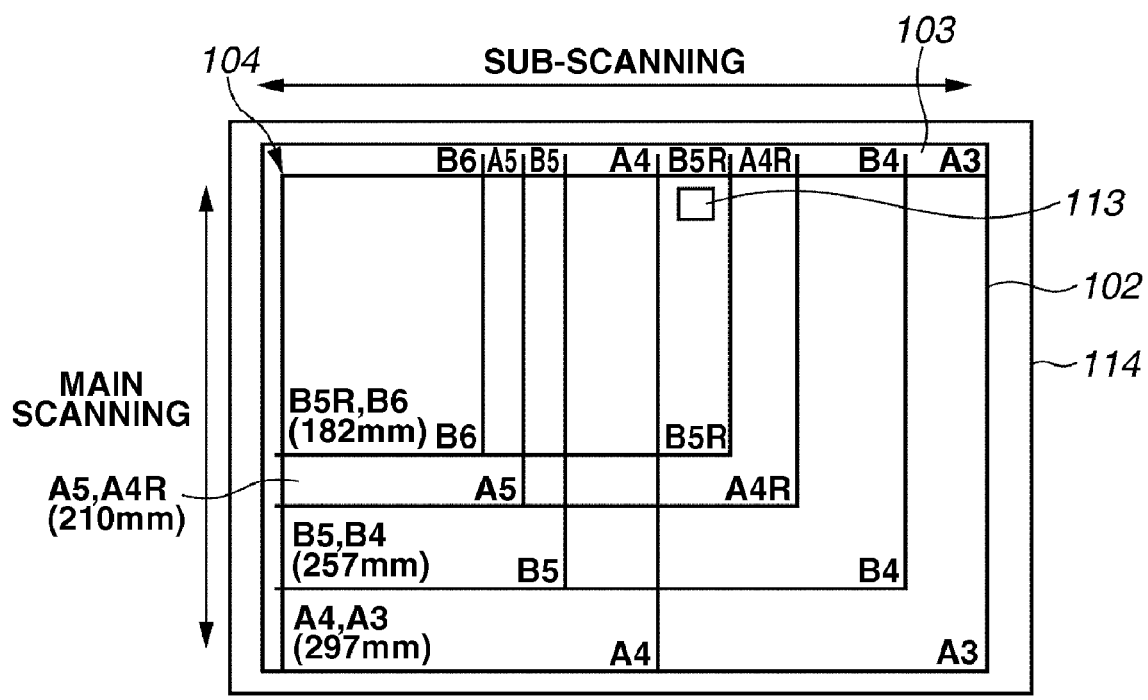
FIG. 3 is a top view of a document positioning glass plate of the document reading apparatus.

FIG. 1 is a front sectional view of a document reading apparatus according to an exemplary embodiment of the present invention. FIG. 2 is a sectional side elevation view of the document reading apparatus. FIG. 3 is a top view of a document positioning glass plate of the document reading apparatus. A document pressing plate 115 presses a document 101 that is set on a document positioning glass plate 102. One side of the document pressing plate 115, which is the side that contacts the document, is white so as to prevent a reverse side reflection from occurring when the document 101 is read.

A casing 114 includes an optical sensor 116 that detects whether an open angle of the document pressing plate 115 reaches a predetermined angle (e.g., 30 degrees). A sensor flag 119 moves up/down according to the open/close movement of the document pressing plate 115. When the document pressing plate 115 is closed and the open angle reaches the predetermined angle, light emitted from a light emitting unit of the optical sensor 116 and directed to a light-receiving unit of the optical sensor 116 is cut off. Then, the optical sensor 116 detects that the open angle of the document pressing plate 115 has reached the predetermined angle.

The document positioning glass plate 102 has a document size label 103 on its periphery as well as a document alignment mark 104 at its document alignment corner. Various standard size documents can be set as illustrated in FIG. 3.

Figure 4:
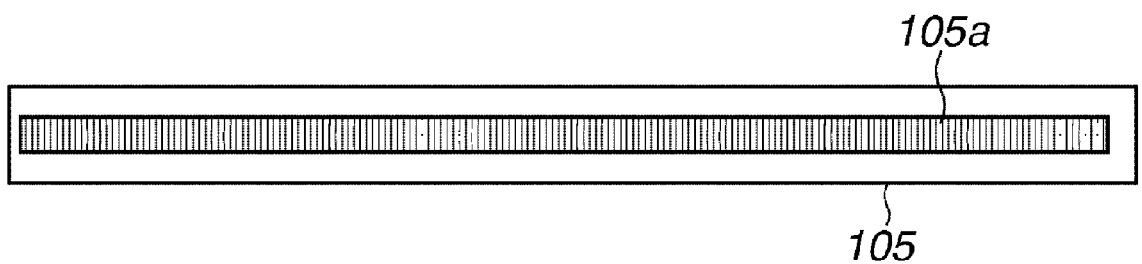
FIG. 4 illustrates a configuration of a lamp.
Figure 5:
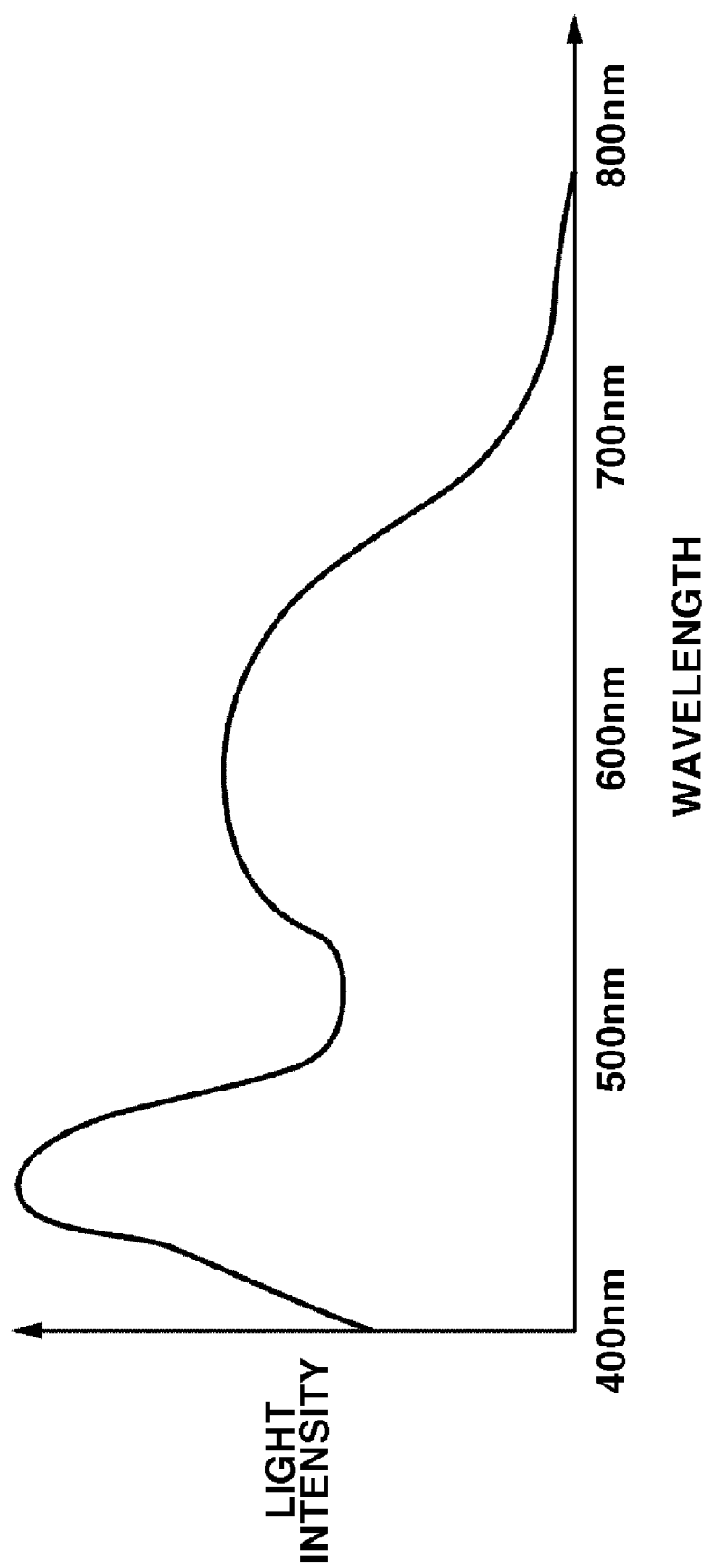
FIG. 5 is a graph illustrating spectral intensity of the lamp.

A lamp 105, which is mounted on an optical bench 107, is a light source configured to emit light onto a document surface. The lamp 105 includes a plurality of white light-emitting diodes (LEDs) 105a arranged as illustrated in FIG. 4. FIG. 5 illustrates spectral intensity of the white LED 105a. A mirror 106, which is mounted on the optical bench 107, reflects the light that is emitted from the lamp 105 and reflected by the document.

Mirrors 108 and 109, which are mounted on an optical bench 110, direct the light, which is reflected by the mirror 106 mounted on the optical bench 107, to a lens 111. The lens 111 collects the light reflected from the mirrors 108 and 109. This light is originally the light reflected from the document surface. A CCD 112 is a photoelectric conversion element that photoelectrically converts the light reflected from the document surface and collected by the lens 111. A plurality of sensor elements of the CCD 112 are arranged in a line.

Figure 6:
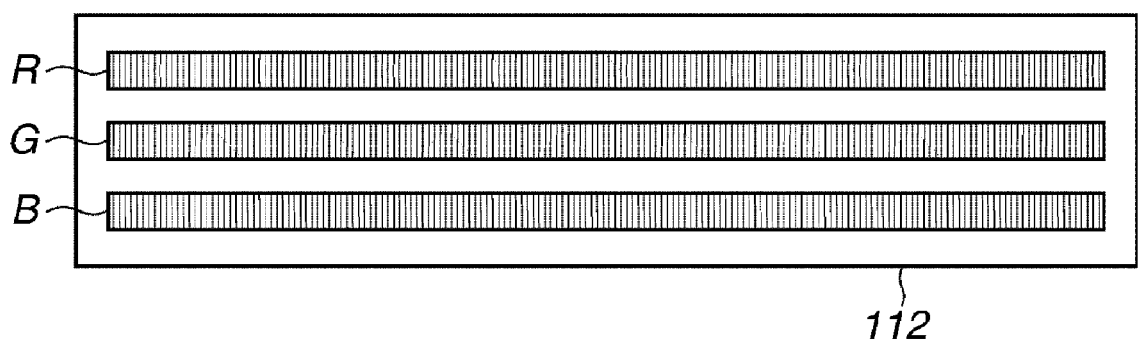
FIG. 6 illustrates a configuration of a CCD.
Figure 7:
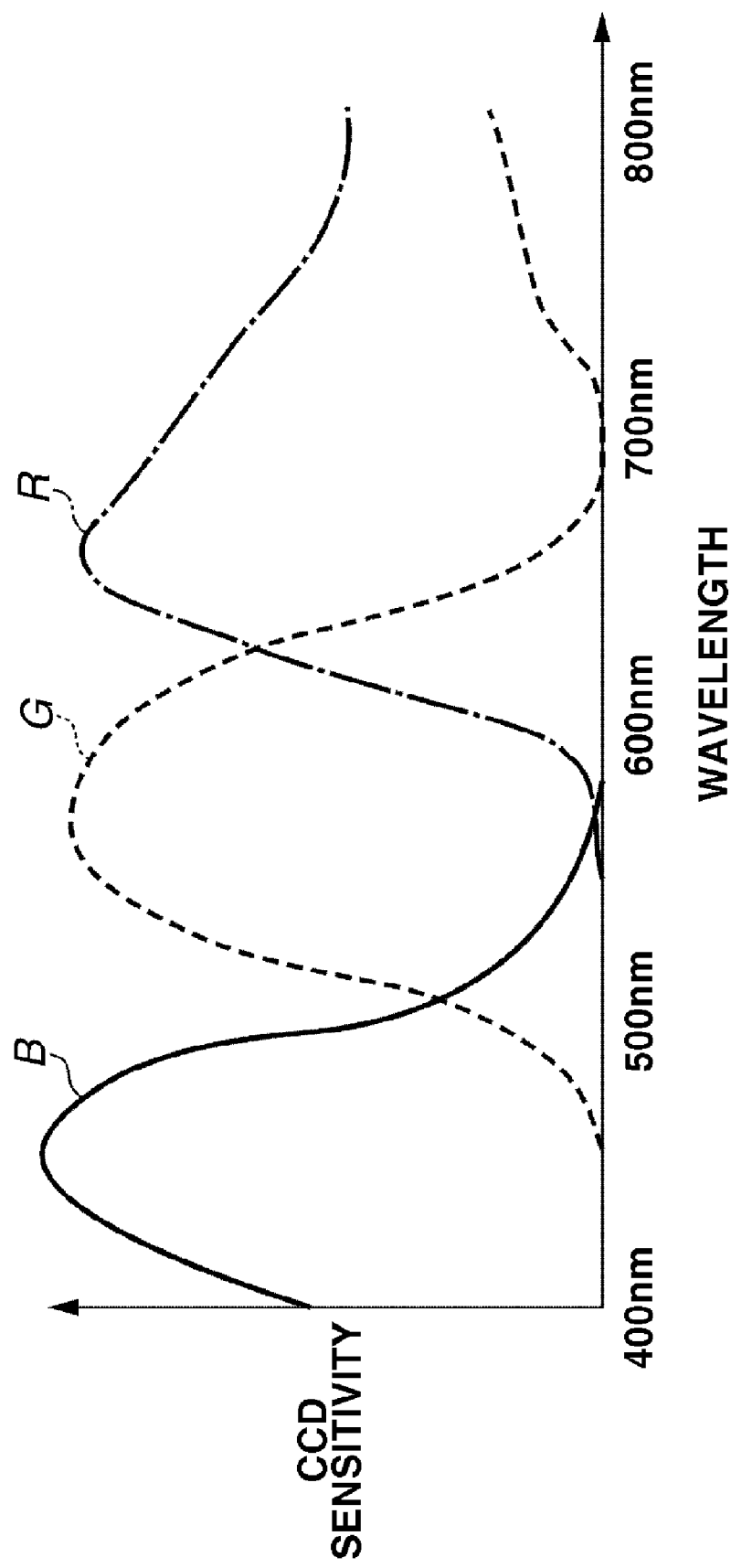
FIG. 7 illustrates spectral sensitivity of the CCD.

The CCD 112 photoelectrically converts the light reflected by the document with respect to each of red (R), green (G), and blue (B) color components. As illustrated in FIG. 6, the CCD 112 is a three-line image sensor including R, G, and B color filters. The CCD 112 receives light from the document surface for the three color components at the same time and scans an image in R, G, and B color components. Spectral sensitivity of the R, G, and B components of the CCD 112 is illustrated in FIG. 7.

A document size detection sensor 113 detects the presence or absence of a document at at least one point on the document positioning glass plate 102. The document size detection sensor 113 outputs a signal indicating that a document is present or absent at a position where the document size detection sensor 113 is located.

Figure 8:
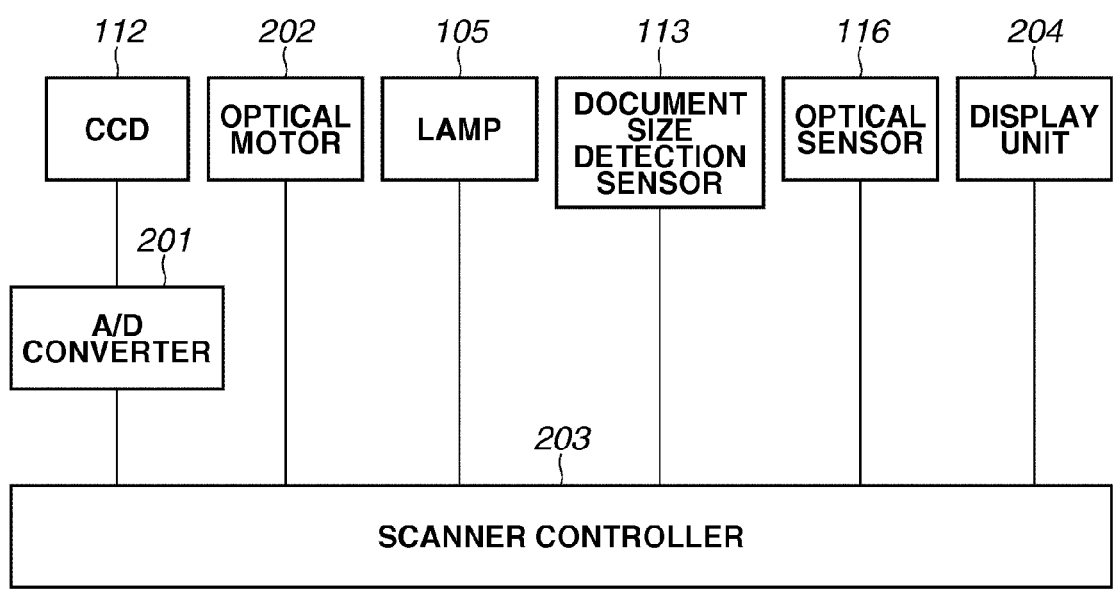
FIG. 8 is a control block diagram of the document reading apparatus.

FIG. 8 is a control block diagram of the document reading apparatus. An A/D converter 201 converts a signal output from the CCD 112 into digital data. An optical motor 202 moves the optical bench 107 and the optical bench 110 when a document set on the document positioning glass plate 102 is scanned. The lamp 105 emits light onto the document surface as described above. The document size detection sensor 113 detects the length of the document in the sub-scanning direction (sub-scanning length). The sub-scanning direction is a direction perpendicular to the main scanning direction. The optical sensor 116 detects whether the open angle of the document pressing plate 115 reaches a predetermined angle. A display unit 204 displays setting contents of the document reading apparatus, which include the result of the document size detection.

Figure 9:
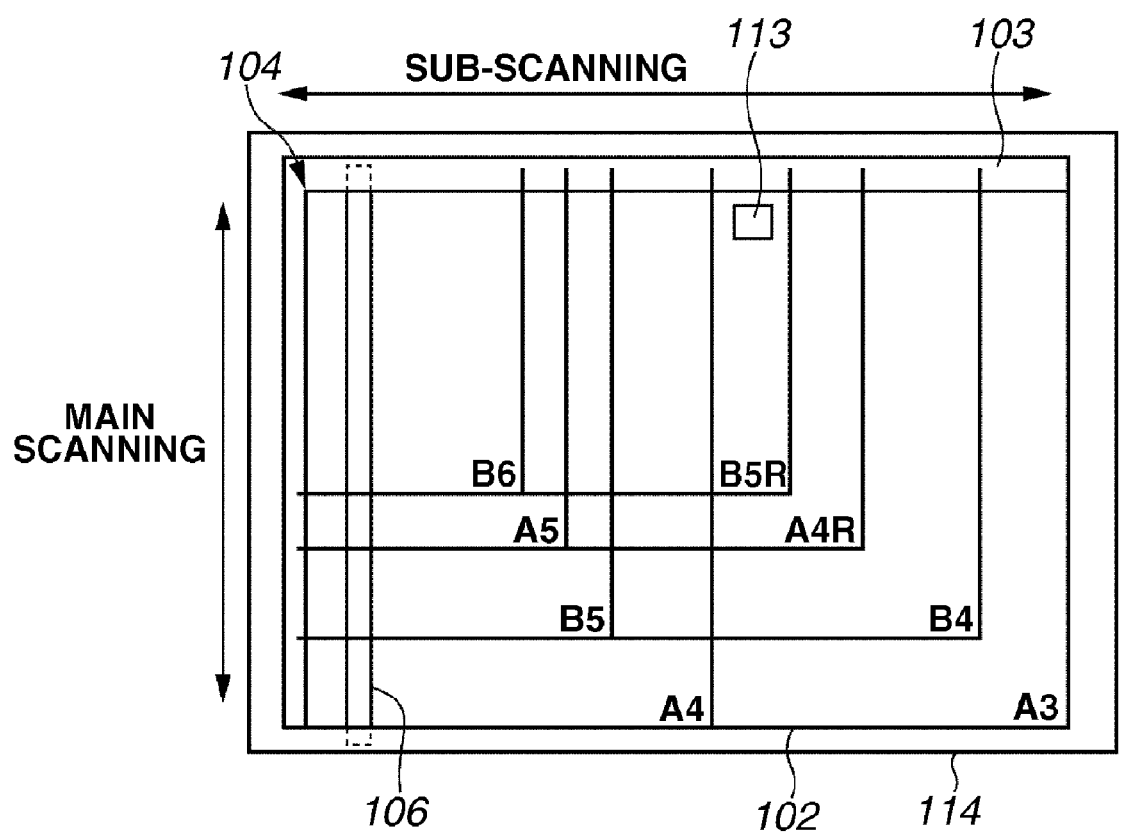
FIG. 9 illustrates the position of a mirror when the document size is detected.

A scanner controller 203 controls the CCD 112, the optical motor 202, and the lamp 105. The optical sensor 116 outputs a signal that indicates that the document pressing plate 115 reaches the predetermined angle. This signal triggers the start of the document size detection operation of the scanner controller 203. According to the document size detection operation, the length of the document in the main scanning direction (main scanning length) is detected based on an output of the CCD 112 when the lamp 105 is turned on and the mirror 106 is stopped at a position illustrated in FIG. 9. The main scanning direction is the direction in which sensor elements the CCD 112 are arrayed.

Further, to identify the size of the document from among a plurality of documents having the same main scanning length, the scanner controller 203 detects whether a document is present at the position of the document size detection sensor 113. Then, the scanner controller 203 determines the document size based on the result of the detection of the main scanning length and a detection result obtained from the document size detection sensor 113 while referring to a table stored in the scanner controller 203. An example of the table is illustrated in FIG. 10. The scanner controller 203 displays the determined document size on the display unit 204.

Figure 11:
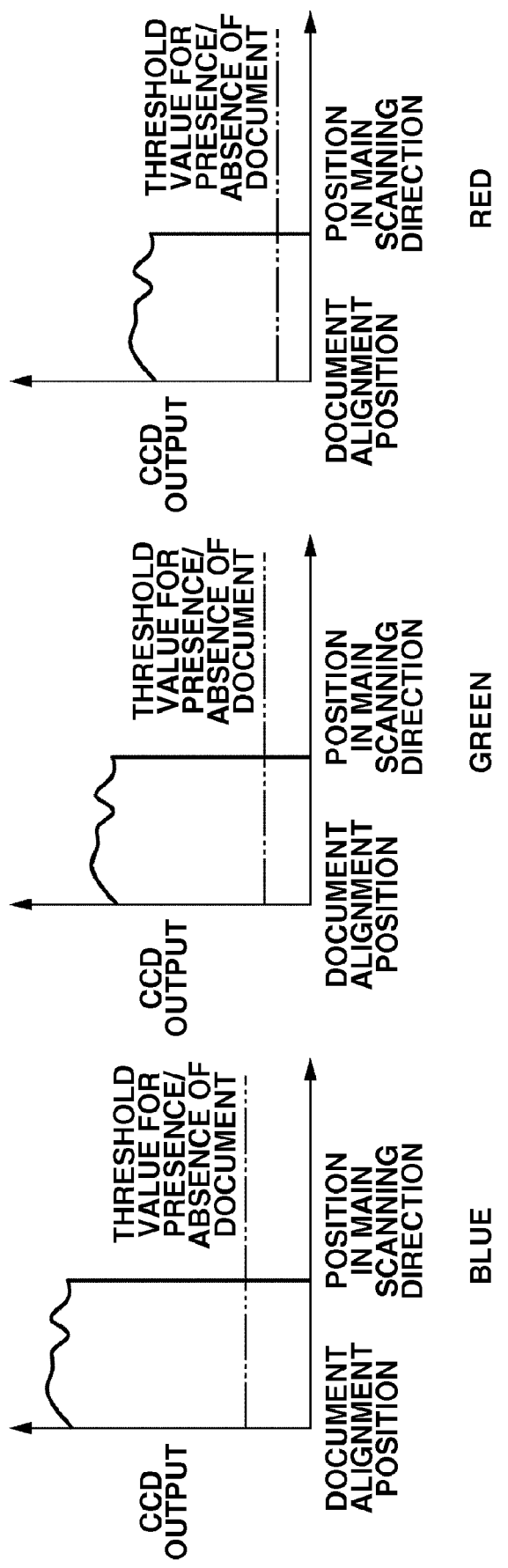
FIG. 11 illustrates an output level of the CCD with respect to each position in the main scanning direction when the document size is detected.

The detection of the main scanning length of a document based on an output of the CCD 112 will be described below. As described above, the main scanning length of a document is detected based on an output of the CCD 112 when the document pressing plate 115 is at a predetermined angle (e.g., 30 degrees). FIG. 11 illustrates an output level of the CCD 112 with respect to each position in the main scanning direction when the document size is detected. As illustrated in FIG. 11, in a main scanning area where the document is present, since the light that is emitted from the lamp 105 is reflected by the document, a signal is output from the CCD in that area. On the other hand, in a main scanning area where the document is absent, since the light that is emitted from the lamp 105 is not reflected by the document, no signal is output from the CCD in that area.

Although the light that is emitted from the lamp 105 but is not reflected by the document is directed to the document pressing plate 115, since the document pressing plate 115 is opened at the predetermined angle, the light reflected by the document pressing plate 115 is not incident on the CCD 112. Then, the document is determined to be present in an area where R, G, and B outputs of the CCD 112 exceed respective predetermined threshold values. The reason why the threshold values of the R, G, and B outputs are different is because the light intensity of the lamp 105 differs with the R, G, and B components. Since an area where the document is present can be determined based on the CCD output, the main scanning length of the document can be detected.

If ambient light such as interior illumination or sunlight, however, is incident on an area where the document is not present, the document size detection sensor 113 may make an error in detecting the main scanning length of the document.

Figure 12:
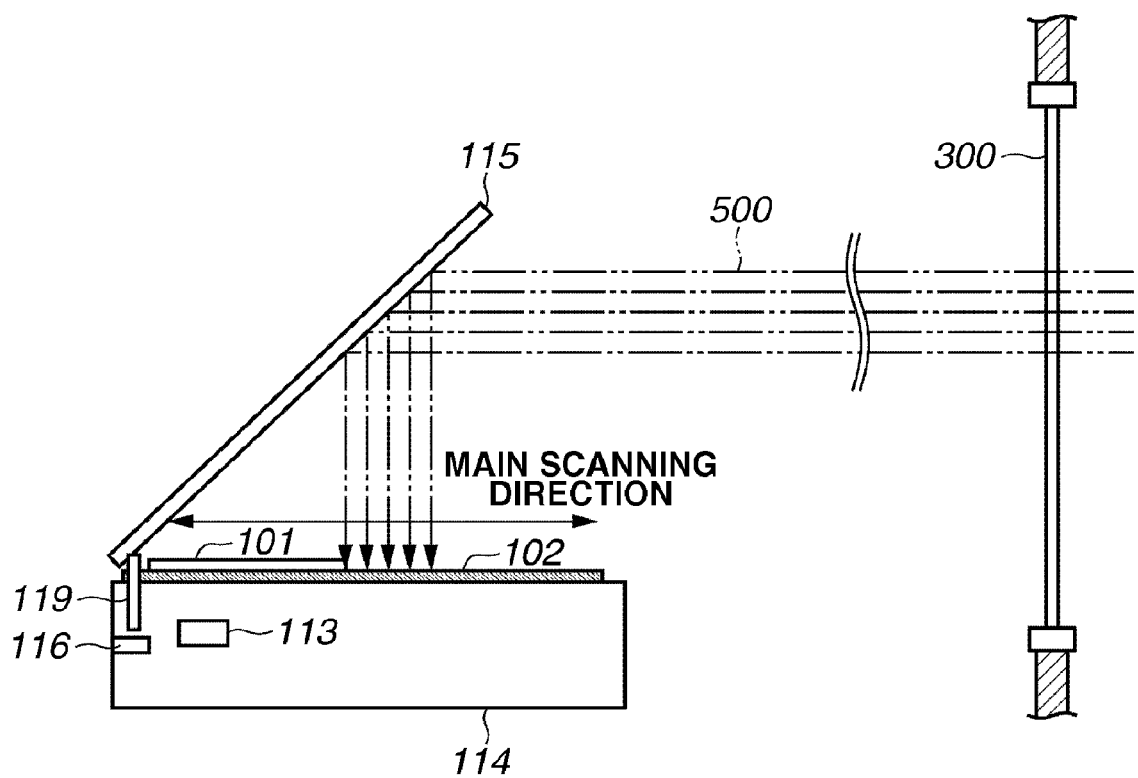
FIG. 12 illustrates evening sunlight as ambient light incident on the document positioning glass plate.

FIG. 12 illustrates evening sunlight as ambient light incident on the document positioning glass plate 102. Evening sunlight 500 that passes through a window glass 300 is incident on the document positioning glass plate 102 along a direction indicated by arrows in FIG. 12 depending on an installation location of the document reading apparatus. In this case, since the evening sunlight 500 reflected by the document pressing plate 115 is incident on the document positioning glass plate 102 as illustrated in FIG. 12, the CCD 112 outputs a signal even in a main scanning area where the document is not present.

Figure 13:
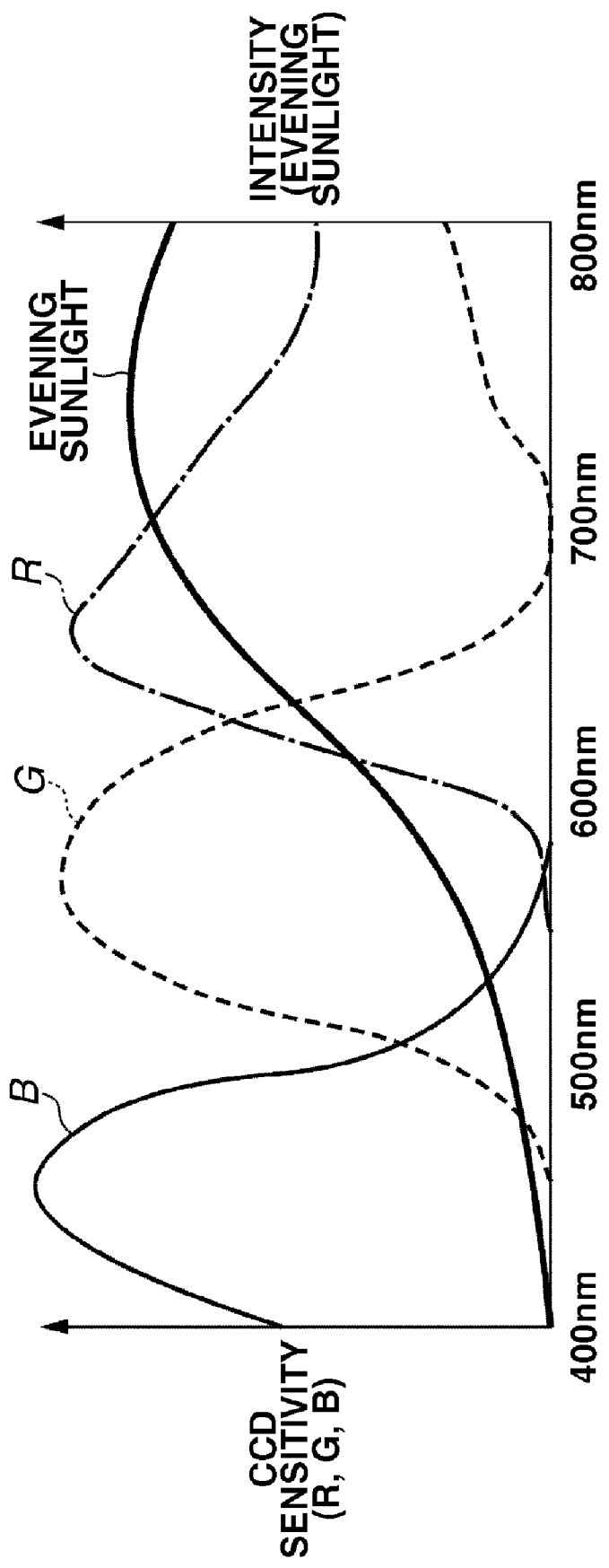
FIG. 13 is a graph illustrating a relation between light intensity of the evening sunlight and spectral sensitivity of the CCD.

FIG. 13 illustrates a relation between light intensity of the evening sunlight and spectral sensitivity of the CCD 112. As illustrated in FIG. 13, the intensity of the evening sunlight becomes higher as the wavelength becomes longer. Further, the output of the CCD 112 for the R component is likely to be affected by the evening sunlight compared to the output of the CCD 112 for other components.

Figure 14:
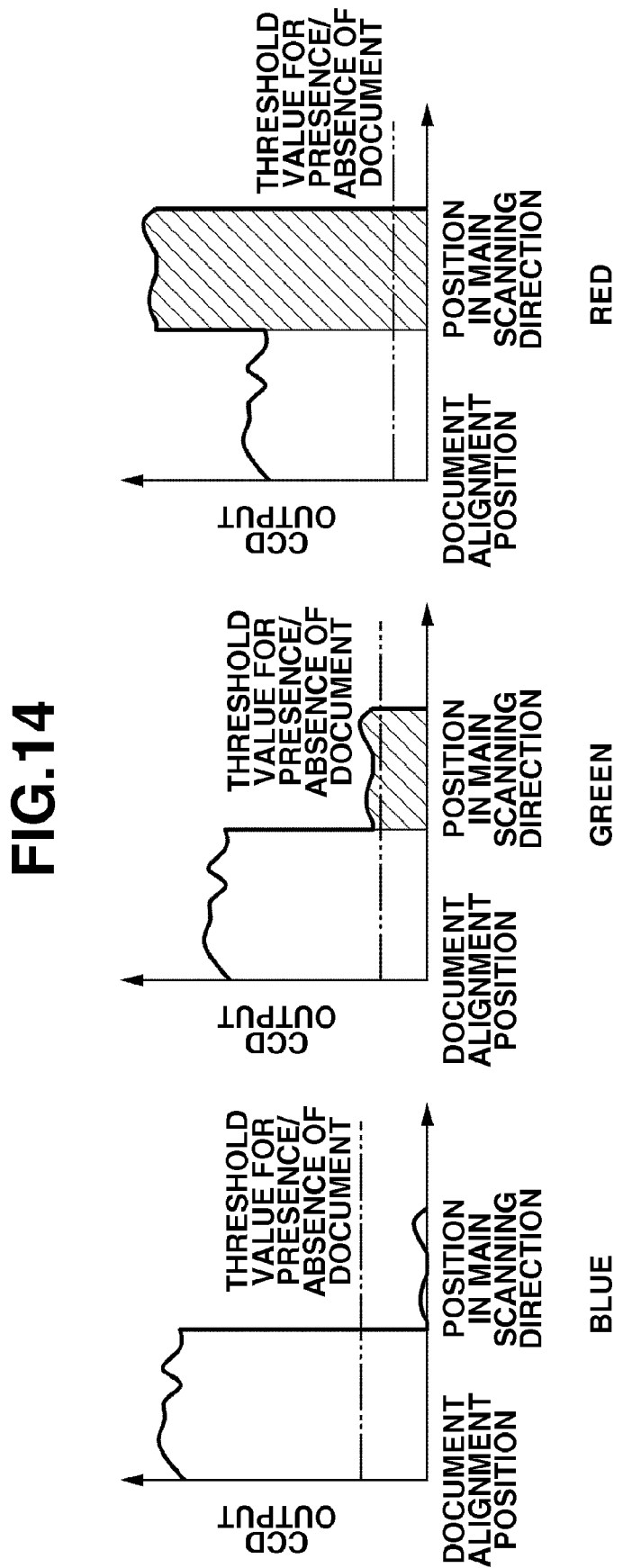
FIG. 14 illustrates an output level of the CCD with respect to each position in the main scanning direction when the evening sunlight as ambient light is incident on the document positioning glass plate when the document size is detected.

FIG. 14 illustrates an output level of the CCD 112 with respect to each position in the main scanning direction when the evening sunlight as ambient light is incident on the document positioning glass plate 102 at the time the document size is detected. As illustrated in FIG. 14, the values of the R and G outputs in an area where the document is absent exceed the respective threshold values due to the influence of the ambient light. For example, if a document is determined to be present on condition that at least two of the R, G, and B outputs exceed the respective threshold values, then a detection error occurs. More particularly, although the document is not present in that area, a document having a maximum main scanning length may be determined to be present on the document positioning glass plate 102.

If the R component is excluded from the component used for the document size detection, it may be effective for the evening sunlight. However, it is not effective for the ambient light at other wavelengths. Thus, according to the present embodiment, the document reading apparatus is configured to detect the main scanning length of a document based on an output whose maximum level is the smallest of R, G, and B outputs from the CCD 112 when receiving ambient light.

Figure 15:
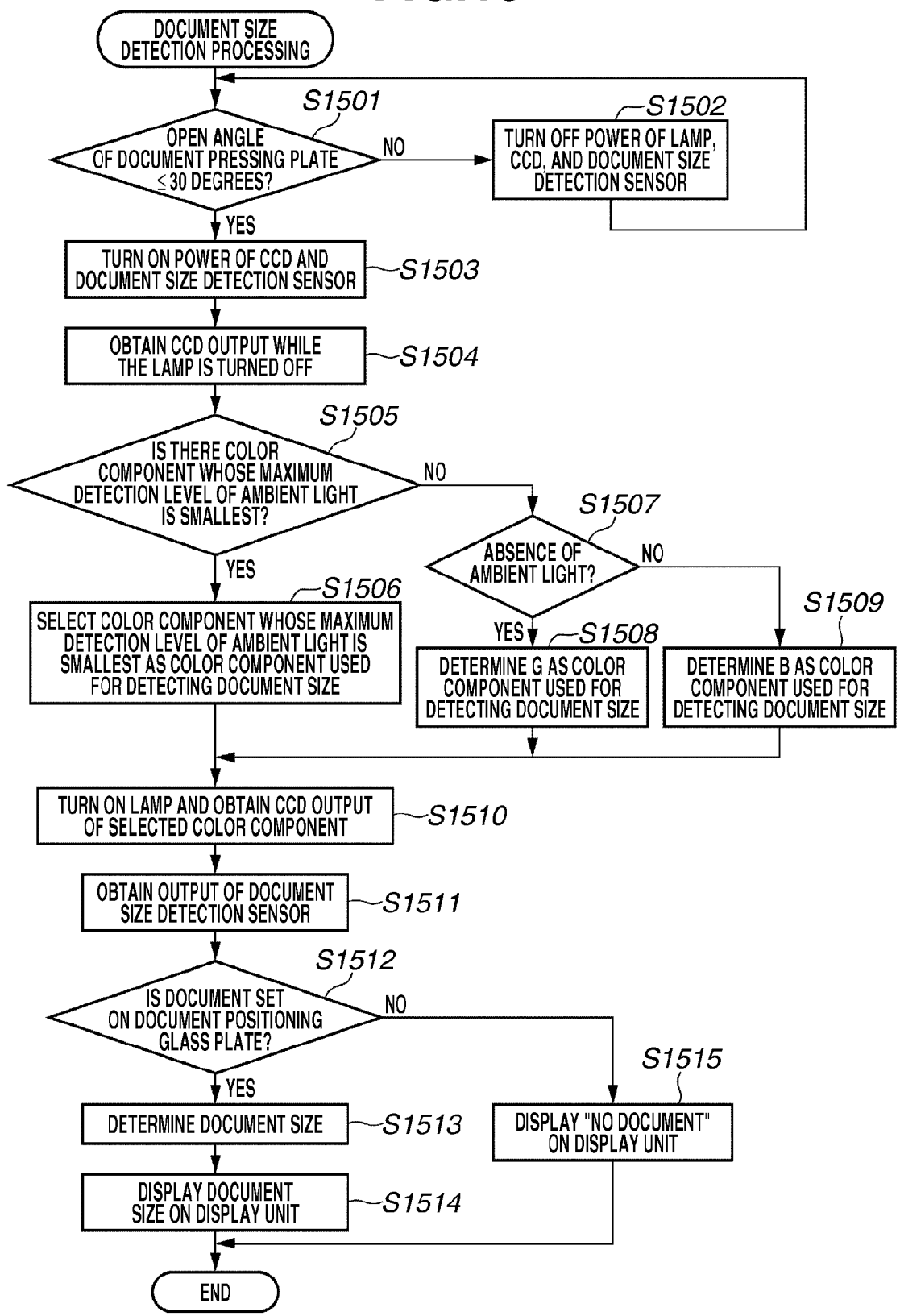
FIG. 15 is a flowchart illustrating document size detection processing executed by a scanner controller.

FIG. 15 is a flowchart illustrating document size detection processing executed by the scanner controller 203. A program that is used in executing this processing is stored in a read only memory (ROM) in the scanner controller 203. A central processing unit (CPU) in the scanner controller 203 loads and executes the program stored in the ROM.

In step S1501, the scanner controller 203 determines whether the open angle of the document pressing plate 115 is 30 degrees or smaller based on an output of the optical sensor 116. If the open angle of the document pressing plate 115 is larger than 30 degrees (NO in step S1501), then the process proceeds to step S1502. In step S1502, power supplied to the lamp 105, the CCD 112, and the document size detection sensor 113 is turned off for energy saving reasons.

In step S1501, if the open angle of the document pressing plate 115 is 30 degrees or smaller (YES in step S1501), then the process proceeds to step S1503. In step S1503, the scanner controller 203 turns on the power of the CCD 112 and the document size detection sensor 113. In step S1504, the scanner controller 203 moves the mirror 106 to a position illustrated in FIG. 9, and then obtains an output from the CCD 112 while the lamp 105 is turned off.

Figure 16:
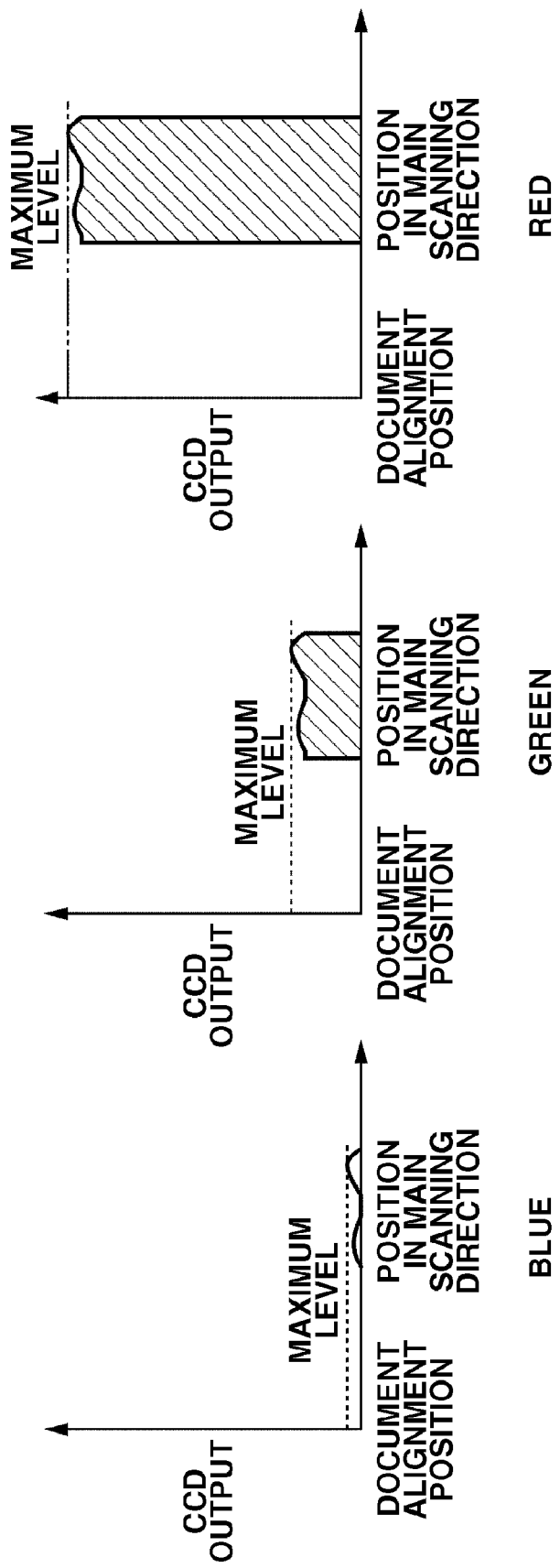
FIG. 16 illustrates an output level of the CCD corresponding to each position in the main scanning direction when the CCD receives ambient light.

In step S1505, the scanner controller 203 detects the respective maximum levels of R, G, and B outputs of the CCD 112, which has received ambient light, and determines a color component whose maximum level is the smallest of the R, G, and B outputs. If a color component whose maximum level is the smallest of the R, G, and B outputs of the CCD 112, which has received ambient light, exists (YES in step S1505), then the process proceeds to step S1506. In step S1506, the scanner controller 203 selects the color component whose maximum level is the smallest as the color component to be used for detection of the document size. If evening sunlight is incident on the document positioning glass plate 102 and CCD outputs are obtained as illustrated in FIG. 16, then the output of the B component can be selected. In FIG. 16, since the lamp 105 is turned off, there is no CCD output in an area where the document is present.

In step S1505, if a color component whose maximum level is the smallest of R, G, and B outputs of the CCD 112 does not exist (NO in step S1505), the process proceeds to step S1507. In step S1507, the scanner controller 203 determines the absence of ambient light. If ambient light is absent, in other words, if, as a result of the determination, an output from the CCD 112 is not detected with respect to each of the R, G, and B color components while the lamp 105 is turned off (YES in step S1507), then the process proceeds to step S1508. In step S1508, the scanner controller 203 selects the G component as the color component to be used for the document size detection. In this case, the G component is selected since the CCD for the G component has spectral sensitivity close to the wavelength for the R component as well as the wavelength for the B component, and thus possibility of document size detection error is low. However, a color component other than the G component can also be selected for another reason.

On the other hand, in step S1507, if a color component having whose maximum level is the smallest of the R, G, and B outputs of the CCD 112 does not exist but the ambient light is present, in other words, if the maximum output levels of the R, G, and B components are the same when the ambient light is received (NO in step S1507), then the process proceeds to step S1509. In step S1509, the scanner controller 203 selects the B component as the color component to be used for detection of the document size. This is because the spectral intensity of the lamp 105 according to the present embodiment is higher at around 450 nm (B component) than at the other color components, as illustrated in FIG. 5. If the spectral intensity of the lamp 105 is different from that illustrated in FIG. 5, then the color component selected in step S1509 can be changed to a color component that matches the spectral intensity of the lamp 105.

Figure 17:
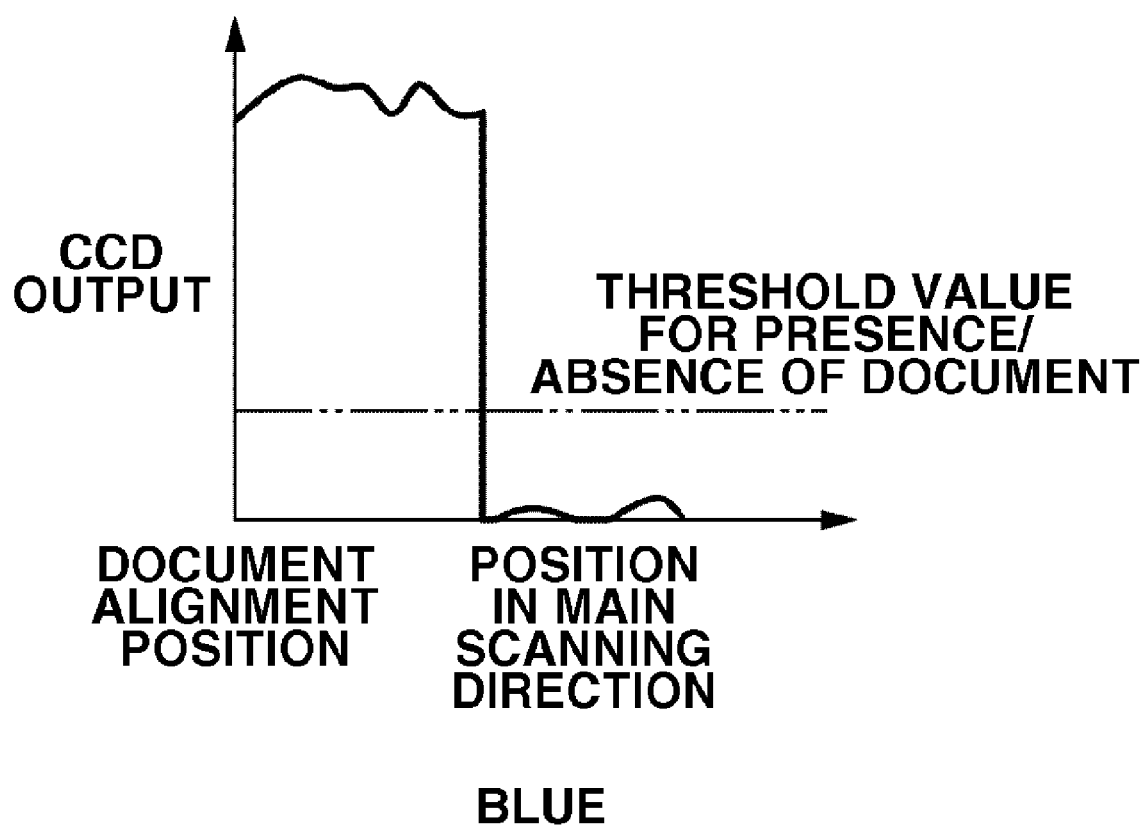
FIG. 17 illustrates an output level of the CCD of a color component which is selected as the color component to be used for the document size detection. The output level corresponds to each position in the main scanning direction.

In step S1510, the scanner controller 203 turns on the lamp 105 and obtains the CCD output of the color component selected as the component to be used for detection of the document size. For example, if the B component is selected, an output such as the one illustrated in FIG. 17 is obtained. In step S1511, the scanner controller 203 obtains the output of the document size detection sensor 113. Then, in step S1512, the scanner controller 203 determines whether an area where the output of the CCD 112 is equal to or greater than a threshold value exists, in other words, the scanner controller 203 determines whether a document is set on the document positioning glass plate 102.

In step S1512, if a document is determined to be set on the document positioning glass plate 102 (YES in step S1512), then the process proceeds to step S1513. In step S1513, the scanner controller 203 determines the document size using the output from the CCD 112 of the color component that has been selected as the color component to be used for detection of the document size and also the output of the document size detection sensor 113. More specifically, the scanner controller 203 detests the main scanning length of the document based on an output from the CCD 112 with respect to the color component that has been selected as the color component to be used for the document size detection, to determine the size of the document in the main scanning direction.

To identify the size of the document from among the various documents having the same length in the main scanning direction, the scanner controller 203 detects whether the document is present at the position of the document size detection sensor 113. Then, the scanner controller 203 determines the document size based on the two detection results while referring to the table (see FIG. 10) stored in the scanner controller 203.

In step S1514, the scanner controller 203 displays the document size on the display unit 204 and moves the optical bench 107 a distance that matches the document size. Then, the scanner controller 203 causes the CCD to output a scanned image that matches the width of the document size. In step S1512, if a document is determined as not set on the document positioning glass plate 102 (NO in step S1512), then the process proceeds to step S1515. In step S1515, the scanner controller 203 displays on the display unit 204 that no document is set.

According to the present exemplary embodiment, since the document size detection is based on a CCD output of a color component whose maximum level is the smallest of R, G, and B outputs of the CCD 112, which has received ambient light, detection error can be prevented even if ambient light of any color is incident on the document positioning glass plate, and accurate document size detection can be achieved. Thus, the present embodiment is effective to ambient light other than evening sunlight and a similar effect can be obtained if the light is from a fluorescent lamp or an incandescent lamp.

According to a second exemplary embodiment of the present invention, weighting is performed on the CCD output with respect to steps S1505 and S1506 in FIG. 15. According to the first exemplary embodiment, a color component whose maximum level is the smallest of R, G, and B outputs of the CCD 112, which has received ambient light, is selected as the color component to be used for detection of the document size. According to the second exemplary embodiment, the CCD output of each of the R, G, and B components is weighted before calculation using a predetermined weighting coefficient, and then each of the obtained results is compared. The color component having the minimum calculated value is then selected as the color component to be used for detection of the document size.

As illustrated in FIG. 11, according to the spectral sensitivity of the CCs of the R, G, and B components of the CCD 112 are different. On the other hand, since various colors of ambient light are available, influence of the ambient light to the CCD output of each color component is different. As illustrated in FIG. 11, regarding the output of the CCD, which has received the light reflected by the document, the CCD output of the R component is the smallest. In such a case, even if the ambient light does not include much R component, it is not always appropriate to select the R component as the color component to be used for the document size detection. Thus, according to the second exemplary embodiment, the output levels of the R, G, and B components are calculated so that the outputs are at the same level.

According to the present embodiment, the arithmetic expression of the weighting is as follows:

$$Ro = R \times K1$$

$$Go = G \times K2$$

$$Bo = B \times K3$$

R: R ambient light detection value
G: G ambient light detection value
B: B ambient light detection value
K1: R weighting coefficient
K2: G weighting coefficient
K3: B weighting coefficient Values of K1, K2, and K3 are determined such that Ro, Go, and Bo are at the same level. For example, if the outputs before the calculation are such as those illustrated in FIG. 11, then the values of K1, K2, and K3 are set as K1>K2>K3. According to the present exemplary embodiment, accurate document size detection can be achieved considering the influence of the spectral sensitivity of the CCD and the spectral intensity of the lamp. Thus, detection error due to ambient light can be prevented.

According to the above-described exemplary embodiment, a color component with a relatively small output is selected from among the outputs of the CCD in a state where the lamp is turned off, and the document size is detected based on an output of a color component that is selected from among the CCD outputs in a state where the lamp is turned off. However, the present invention is not limited to such an example. In other words, although one of the R, G, and B components of the CCD output is selected according to the above-described exemplary embodiment, a mixed output of the R, G, and B components with a wavelength of a relatively small output with respect to the spectral intensity of the ambient light can be used instead of one component as the color component to be used for detection of the document size. In this case, weighting according to a wavelength where the spectral intensity of the ambient light is low is performed to each of the R, G, and B outputs of the CCD.

According to the present exemplary embodiment, the color component of ambient light is determined based on an output of the image sensor with respect to each color component while the light source is turned off, and the size of the document is detected based on an output obtained by reducing the effect of the color component included in the ambient light from the output of the image sensor while the light source is turned on. Thus, regardless of any color of ambient light, the document size can be accurately detected while preventing detection error.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-235009 filed Sep. 12, 2008, which is hereby incorporated by reference herein in its entirety.

What is claimed is:

1. A document reading apparatus comprising:
   a document positioning plate configured to set a document to be read thereon;
   a light source configured to emit light onto an area where the document is set on the document positioning plate;
   an image sensor configured to photoelectrically convert reflected light of the light emitted from the light source to output color signals; and
   a document size detection unit configured to select a color signal used for document size detection from among the color signals output from the image sensor based on color signals output from the image sensor in a state where the light source is turned off, and to detect a size of the document set on the document positioning plate based on the selected color signal output from the image sensor in a state where the light source is turned on.

2. The document reading apparatus according to claim 1, wherein the image sensor includes photoelectric conversion elements arrayed in a line, and
   wherein the document size detection unit detects a length of the document in a main scanning direction, in which the photoelectric conversion elements are arrayed, based on the color signal output from the image sensor.

3. The document reading apparatus according to claim 2, further comprising a presence/absence detection unit configured to detect presence or absence of the document at at least one point on the document positioning plate, and wherein the document size detection unit detects the size of the document based on a result of detection performed by the presence/absence detection unit and the color signal output from the image sensor.

4. The document reading apparatus according to claim 1, wherein the document size detection unit detects the size of the document based on whether the document is present in an area where the color signal output from the image sensor exceeds a threshold value.

5. The document reading apparatus according to claim 1, wherein the document size detection unit selects a color signal that is relatively small from among the color signals output from the image sensor in a state where the light source is turned off as the color signal to be used for the document size detection.

6. The document reading apparatus according to claim 5, wherein the document size detection unit selects a color signal whose maximum level is the smallest of the color signals output from the image sensor in the state where the light source is turned on as the color signal to be used for the document size detection.

7. The document reading apparatus according to claim 5, wherein the document size detection unit selects a color signal whose maximum level weighted by a predetermined factor is the smallest of the color signals output from the image sensor in a state where the light source is turned on as the color signal to be used for the document size detection.

8. The document reading apparatus according to claim 1, wherein the image sensor includes a plurality of photoelectric conversion elements having respective color filters.

9. The document reading apparatus according to claim 1, wherein the image sensor outputs an R signal, a G signal, and a B signal, and wherein the document size detection unit selects the G signal as the color signal to be used for the document size detection if no color signal is output from the image sensor in a state where the light source is turned off.

10. A document reading apparatus comprising:
a document positioning plate configured to set a document to be read thereon;
a light source configured to emit light onto an area where the document is set on the document positioning plate;
an image sensor configured to photoelectrically convert reflected light of the light emitted from the light source to output color signals; and
a document size detection unit configured to determine a color of ambient light incident from outside the document reading apparatus based on the color signals output from the image sensor, which has received the ambient light, and to detect a size of the document set on the document positioning plate based on a color signal relatively less affected by the ambient light out of the color signals output from the image sensor, which has received light reflected from the document on the document positioning plate and the ambient light.

* * * * *